United States Patent

Krüger et al.

[11] Patent Number: 5,969,064
[45] Date of Patent: Oct. 19, 1999

[54] PROCESS FOR THE PREPARATION OF LOW-VISCOSITY FLUORINATED RUBBERS

[75] Inventors: Ralf Krüger; Wilhelm-Franz Biener, both of Bergisch Gladbach, Germany

[73] Assignee: Bayer Aktiengesellschaft, Leverkusen, Germany

[21] Appl. No.: 09/153,132

[22] Filed: Sep. 15, 1998

[30] Foreign Application Priority Data

Sep. 16, 1997 [DE] Germany ............ 197 40 633

[51] Int. Cl.⁶ .................................. C08F 2/00
[52] U.S. Cl. ........................ 526/204; 526/222
[58] Field of Search ................... 526/204, 222

[56] References Cited

U.S. PATENT DOCUMENTS

| | | | |
|---|---|---|---|
| 4,243,770 | 1/1981 | Tatemoto et al. | 525/331 |
| 4,329,478 | 5/1982 | Behr | 526/204 |
| 4,332,954 | 6/1982 | Koshar | 526/204 |
| 5,182,342 | 1/1993 | Feiring et al. | 526/206 |
| 5,378,782 | 1/1995 | Grootaert | 526/204 |
| 5,637,663 | 6/1997 | Arolick et al. | 526/204 |

*Primary Examiner*—Bernard Lipman
*Assistant Examiner*—N. Sarofim
*Attorney, Agent, or Firm*—Joseph C. Gil; Noland J. Cheung

[57] ABSTRACT

The present invention therefore provides a new process for the preparation of low-viscosity fluorinated rubbers, in which at least one fluorine monomer is polymerized by free radicals in the presence of one or more compounds of the formula (I) or (II)

$$R^1-SO_2-R^2, \quad (I)$$

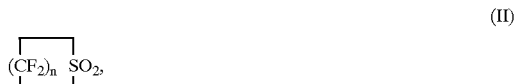

wherein $R^1$ represents a fluorine atom or a perfluoroalkyl radical having 1 to 4 carbon atoms and $R^2$ represents a perfluoroalkyl radical having 1 to 4 carbon atoms and n=4 or 5, and, optionally, a molecular weight regulator.

19 Claims, No Drawings

PROCESS FOR THE PREPARATION OF LOW-VISCOSITY FLUORINATED RUBBERS

FIELD OF THE INVENTION

The present invention relates to a new process for the preparation of low-viscosity fluorinated rubbers.

BACKGROUND OF THE INVENTION

In the rubber industry, there is a general demand for better processability of the rubbers employed. This concerns the flow properties in particular. The lower the viscosity of the crude rubber, the simpler the processing technology, the greater the productivity and the lower the waste. The aspects mentioned are of great relevance to fluorinated rubbers in particular, since these are expensive rubbers which cannot be processed without reservation on the injection moulding machines of the rubber industry.

The process of emulsion polymerization which has hitherto been customary on an industrial scale is unsuitable for the preparation of low-viscosity fluorinated rubbers, such has have been described e.g. in DE-A 196 40 972.1, since on the one hand the need to use ionic inorganic initiators leads to ionic end groups in the polymer, which increase the viscosity of the polymer, and on the other hand large amounts of molecular weight regulators are necessary, and these as a rule lead to a drastic reduction in the reactor productivity because of side reactions with the initiator in the aqueous phase and termination reactions.

Of the non-aqueous processes, polymerizations in the pure liquefied fluorine monomer have proved to be unfavourable, since the polymers formed are usually not soluble therein and they possess poor swelling properties. A reproducible polymerization procedure with good transfer of heat and material and therefore acceptable reactor productivity is possible to just as little an extent by this route.

In contrast, fluorine monomers can be readily polymerized in the presence of certain fluorine-containing solvents, see e.g. U.S. Pat. No. 4,243,770, DE-A 196 40 972.1. U.S. Pat. No. 5,182,342 describes the use of fluorinated hydrocarbons as the polymerization medium, which meet certain criteria in respect of the F/H ratio and the position of the hydrogens. With all compounds of this type which contain hydrogen and optionally also additionally chlorine, there is always the problem that these can undergo transfer and/or termination reactions. In the case where defined end groups are to be introduced by the molecular weight regulator, however, no additional transfer reactions should start from the solvent under the reaction conditions chosen. This applies in particular to the preparation of low-viscosity rubbers which contain covalently bonded iodine on the terminal carbon atoms due to the use of diiodo-organic chain transfer agents. In DE-A 196 40 972.1, this is achieved by the use of 1,1,2-trichlorotrifluoroethane as the polymerization medium. Compounds of this type (fluorochlorocarbons), however, have a considerable ozone-depleting potential. For this reason, their use in industry is already banned in many industrial countries.

The object of the present invention was therefore to discover a practicable process for the preparation of low-viscosity fluorinated rubbers which proceeds without the use of ozone-depleting compounds.

SUMMARY OF THE INVENTION

It has now been found that at least one compound of the formula (I) or (II)

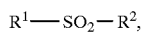

(I)

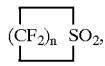

(II)

wherein $R^1$ represents a fluorine atom or a perfluoroalkyl radical having 1–4 C atoms and $R^2$ represents a perfluoroalkyl radical having 1–4 C atoms and n=4 or 5, are suitable media for the preparation of low-viscosity fluorinated rubbers in respect of the criteria discussed above.

DETAILED DESCRIPTION OF THE INVENTION

The present invention therefore provides a process for the preparation of low-viscosity fluorinated rubbers, in which at least one fluorine monomer is polymerized by free radicals in the presence of one or more compounds of the formula (I) or (II)

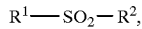

(I)

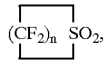

(II)

wherein $R^1$ represents a fluorine atom or a perfluoroalkyl radical having 1–4 C atoms and $R^2$ represents a perfluoroalkyl radical having 1–4 C atoms and n=4 or 5, and, optionally, a molecular weight regulator.

Monomers which can be employed in the context of the invention are fluorinated, optionally substituted ethylenes which, in addition to fluorine, can contain hydrogen and/or chlorine, such as e.g. vinylidene fluoride, tetrafluoroethylene and chlorotrifluoroethylene, fluorinated 1-alkenes having 2–8 carbon atoms, such as e.g. hexafluoropropene, 3,3,3-trifluoropropene, chloropentafluoropropene, hexafluoroisobutene and/or perfluorinated vinyl ethers of the formula $CF_2=CF-O-X$, where $X=C_1-C_3$-perfluoroalkyl or $-(CF_2-CFY-O)n-RF$, wherein n=1–4, Y=F or $CF_3$ and $RF=C_1-C_3$-perfluoroalkyl.

The combination of vinylidene fluoride, hexafluoropropene and, optionally, tetrafluoroethylene and/or perfluorinated vinyl ethers, such as e.g. perfluoro-(methyl vinyl ether), is particularly preferred.

In addition, the use of copolymerizable bromine-containing monomers, such as e.g. bromotrifluoroethylene, 4-bromo-3,3,4,4-tetrafluorobut-1-ene, as described in U.S. Pat No. 4,035,565, or 1-bromo-2,2-difluoroethylene, is also possible for the preparation of peroxidically crosslinkable fluorinated rubbers.

The free-radical polymerization is preferably carried out in the presence of at least one initiator.

In each case organic or fluoro-organic dialkyl peroxides, diacyl peroxides, dialkyl peroxydicarbonates, alkyl peresters and/or perketals are preferably employed as the initiator, e.g. tert-butylperoxypivalate, tert-butylperoxy-2-ethylhexanoate, dicyclohexylperoxydicarbonate, bis (trifluoroacetylperoxide) or the peroxide of hexafluoropropeneoxide-dimer $\{CF_3CF_2CF_2OCF(CF_3)COO\}_2$. The nature and the amount to be employed depend on the particular reaction temperature. The half-lives of the peroxide to be chosen are preferably between 30 and 500 min. Correspondingly, amounts of between 0.05 and 1.0 parts by wt. peroxide per 100 parts by wt. monomers to be reacted are preferably required.

The molecular weights and therefore the viscosities of the target products can be determined via the amount of initiator or by addition of one or more molecular weight regulators. Molecular weight regulators which are preferably employed are compounds of the formula (III)

$$R^3Br_nI_m \qquad (III)$$

where m and n=0 to 2 and m+n=1 or 2, wherein $R^3$ can be an aliphatic hydrocarbon, fluorohydrocarbon, fluorochlorohydrocarbon or fluorocarbon radical having 1–8 carbon atoms. 1,2-Dibromo-1-chlorotrifluoroethane and/or 1-bromo-2-iodo-tetrafluoroethane are preferred as the compound of the formula (III). Diiodo-organic compounds in which the two iodine atoms are bonded to one carbon atom or to different carbon atoms are preferred. Hydrocarbon or fluorocarbon compounds having one or 4 carbon atoms, the iodine being on the terminal carbon atoms, are particularly preferred. Diiodomethane and/or 1,4-diiodoperfluorobutane are especially preferred. The amount of diiodo-organic compound is preferably 0.3 to 3.0 parts by wt. iodine per 100 parts by wt. polymerized fluorine monomer.

In the process according to the invention, the free-radical polymerization is preferably carried out in the presence of at least one fluoro-organic dialkyl peroxide, diacyl peroxide, dialkyl peroxydicarbonate, alkyl perester and/or perketal as an initiator, in combination with a molecular weight regulator of the formula (III) in which $R^3$ is a hydrocarbon radical having 1–8 carbon atoms.

It is also preferable to employ, as the initiator, an organic peroxide which does not contain fluorine, in combination with a molecular weight regulator of the formula (III) in which $R^3$ is a fluorohydrocarbon, fluorochlorohydrocarbon or fluorocarbon radical having 1–8 carbon atoms.

For the preferred case of polymerization in the presence of a diiodo-organic molecular weight regulator, it has proved advantageous for either the molecular weight regulator or the initiator to be fluorinated.

In a particularly preferred embodiment of the process according to the invention, an organic peroxide which does not contain fluorine is employed as the initiator, in combination with a molecular weight regulator of the formula (III)

$$R^3Br_nI_m \qquad (III)$$

in which $R^3$ is a hydrocarbon radical having 1–8 carbon atoms and m and n=0–2 and m+n=1 or 2, a maximum of 10% of the amount of initiator envisaged for the main part being initially introduced or metered in at the start of the polymerization and the remaining amount being added in one portion or in stages after 1 h at the earliest.

The compounds of the formula (I) and (II) are preferably prepared from the corresponding non-fluorinated analogues by electrofluorination or direct fluorination or are even commercially available. Examples of compounds of the formula (I) are $C_3F_7SO_2F$; $C_4F_9SO_2F$ or $(CF_3)_2SO_2$.

The compounds of the formula (I) and (II) prove to be extremely inert towards free radicals, so that practically no additional transfer or termination reactions are to be observed. The resistance of the compounds claimed to water and protic solvents is also sufficiently high.

Because of their low boiling points of between 15 and 70° C. and their low evaporation enthalpy, the compounds mentioned can be separated off from the rubber easily by distillation after the polymerization.

An essential characteristic of the process according to the invention is that under the reaction conditions a large portion of the monomers dissolves in the compounds of the formula (I) and (II) and the resulting rubber polymer forms a second (liquid) phase which is swollen with (I) and (II) and the monomers.

The ratio of fluorine monomer to solvent and the filling level of the reactor are preferably chosen such that the proportion of monomer in the liquid phase at the reaction temperature is at least 20 wt. %. The amount of monomer dissolved in the liquid phase can be determined e.g. from the weight balance with the aid of the partial pressures of the monomer in the gas phase.

The reaction temperatures are preferably between 30 and 130° C. Lower temperatures lead to a prolonging of the running time and to a marked increase in the viscosity of the polymer. At even higher temperatures, the reactor productivity no longer increase substantially. A preferred temperature range for the polymerization is 60–120° C.

The pressure depends on the abovementioned conditions and on the composition of the monomer mixture and is preferably between 10 and 100 bar. The process according to the invention is particularly preferably carried out under pressures of between 20 and 50 bar.

The polymerization can be carried out by the batch, continuous or batch/feed process in stirred tank reactors, the batch/feed process being preferred.

When the polymerization has ended, the reaction mixture can easily be forced out of the tank via the bottom outlet, since the polymer phase has a very low viscosity due to the marked swelling with (I) and/or (II) and, optionally, in combination with elevated temperature (60–120° C.), and can therefore flow out independently.

The term low-viscosity fluorinated rubbers here includes fluorinated rubbers which have complex viscosities, measured with a Bohlin rheometer of the type VOR-Melt (cycle frequency ω=6.3 s-1), of <50 kPa.s at 100° C., preferably <5 kPa.s at 100° C. The complex viscosity quantifies the total resistance of a probe against dynamic shearing. The lower the complex viscosity, the more low-viscous the probe. At this point, a reference is made to J. D. Ferry, "Visco-elastic Properties Of Polymers", 1980, John Wiley & Sons, New York.

The fluorinated rubbers prepared by the process according to the invention can be compounded and crosslinked by conventional methods, cf. Ullmann's Encyclopaedia of Industrial Chemistry, 5th edition, 1993, vol. A 23, chapter 2.6, p. 265–p.269. Because of their low viscosity, advantageous injection moulding technology is available for further processing to elastic articles.

Compounds which are suitable for the crosslinking are bisnucleophiles, such as bisamines, e.g. hexamethylenediamine, or bisphenols, e.g. 2,2-bis(4-hydroxyphenyl)hexafluoropropane ("bisphenol AF"), in combination with crosslinking accelerators, such as quaternary phosphonium, ammonium or sulfonium salts, and acid acceptors, such as magnesium oxide and calcium hydroxide, cf. A. L. Logothetis in Polym. Sci. 14(1989) 251–296. Alternatively, fluorinated rubbers which have been prepared by the process according to the invention and contain bromine and/or iodine bonded covalently to the main or side carbon chain can be crosslinked by organic peroxides, such as 2,5-dimethyl-2,5-bis-(tert-butyl)-hexane, in combination with co-crosslinking agents, such as triallyl isocyanurate (see e.g. EP-A 398 241).

The following examples serve to illustrate the invention, but without the effect of limiting it.

EXAMPLES

Example 1

1.08 kg of a mixture of 90 wt. % perfluorobutanesulfonyl fluoride (PFBSF) and 10 wt. % perfluorosulfolane (PFS) and 15 g diiodoperfluorobutane (DIPFB, Fluorochem Ltd.), after prior purification by extraction by shaking with aqueous sodium thiosulfate solution were initially introduced into a 4.1 l autoclave. The closed autoclave was in each case evacuated twice, subsequently charged with a nitrogen pressure of 3 bar and in each case stirred slowly for 10 min, while cooling. 440 g vinylidene fluoride (VDF) and 1,027 g hexafluoropropene (HFP) were introduced into the evacuated autoclave and the reaction mixture was heated to 80° C., while stirring. When this temperature was reached, the internal pressure in the autoclave was 33 bar. The polymerization was initiated by addition of 2.6 g tert-butyl peroxy-2-ethyl-hexanoate (Peroxid-Chemie GmbH) with a peroxide content of 96.1%. The polymerization started after a few minutes, detectable by the start of the decrease in pressure. During the polymerization, a monomer mixture of 60 wt. % vinylidene fluoride and 40 wt. % hexafluoropropene was subsequently forced in such that the internal pressure in the autoclave was kept constant at 33±0.4 bar. A total of 302 g vinylidene fluoride and 201 g hexafluoropropene were subsequently metered in within a reaction time of 472 min in this way. When the polymerization had ended, the unreacted monomer mixture was removed from the reactor by pressure release and evacuation. 15 min after the stirrer had been switched off, the remaining contents of the reactor (polymer+PFBSF/PFS mixture) was drained off completely via a bottom outlet valve into a second pressure vessel underneath. No residues of product at all remained in the reactor.

After the product (806 g) swollen with solvent had been separated off from the supernatant PFBSF/PFS solution, which still contained 1.86 wt. % polymeric residues, this was dried in a vacuum drying oven at 60° C. for 24 h, the solvent being condensed in a cold trap and 530 g of a viscous copolymer resulting.

The following copolymer composition was determined by $^{19}$F-NMR analyses (solvent: acetone; standard: CFC13): 21.5 mole % hexafluoropropene, 78.5 mole % vinylidene fluoride.

The iodine content of the polymer, determined by elemental analysis, was 1.35 wt. %.

The complex viscosities were measured at various temperatures using a Bohlin rheometer of the type VOR MELT. The results are listed in table 1.

To prepare a crosslinkable mixture, 30 parts carbon black MT N 990, 3 parts calcium hydroxide, 4 parts Perkalink 301/50 (triallyl isocyanurate, 50% on silica gel) and 3 parts Luperco 101 XL-45 (2,5-dimethyl-2,5-bis(tert-butylperoxy)-hexane; 45% in inactive fillers) were incorporated into 100 parts by wt. of the fluorinated rubber copolymer on a well-cooled twin-roll mill.

To determine the crosslinking properties, the peroxide-containing mixtures were investigated in a Monsanto rheometer of the type MDR 2000 E at 170° C. (measuring time 30 min).

The mixtures were vulcanized under pressure at 170° C. under 200 bar in moulds for 1×10×10 mm sheets for 15 min and then post-cured in a circulating air oven (1 h at 160° C., 1 h at 170° C., 2 h at 180° C. and 20 h at 230° C.). Tensile stress/strain properties were determined on the vulcanized articles. The results are listed in table 2.

Example 2

1.01 kg of a mixture of 90 wt. % perfluorobutanesulfonyl fluoride (PFBSF) and 10 wt. % perfluorosulfolane (PFS) and 9 g diiodomethane (DIM, Merck) were initially introduced into a 4.1 l autoclave. The closed autoclave was in each case evacuated twice, subsequently charged with a nitrogen pressure of 3 bar and in each case stirred slowly for 10 min, while cooling. 440 g vinylidene fluoride (VDF) and 1,028 g hexafluoropropene (HFP) were introduced into the evacuated autoclave and the reaction mixture was heated to 60° C., while stirring. When this temperature was reached, the internal pressure in the autoclave was 27 bar. The polymerization was initiated by addition of 66 g of a 1% solution of bis(trifluoroacetyl) peroxide in PFBSF. The polymerization started after a few minutes, detectable by the start of the decrease in pressure. During the polymerization, a monomer mixture of 60 wt. % vinylidene fluoride and 40 wt. % hexafluoropropene was subsequently forced in such that the internal pressure in the autoclave was kept constant at 27±0.4 bar. After 3 and 6 h, in each case 33 g of the 1% peroxide solution were again added. A total of 303 g vinylidene fluoride and 200 g hexafluoropropene were subsequently metered in within a reaction time of 1,184 min. 530 g of a viscous copolymer could be isolated by a working up analogous to that in example 1.

The copolymer composition was 21.5 mole % hexafluoropropene, 78.5 mole % vinylidene fluoride.

The iodine content of the polymer was 1.4 wt. %.

The complex viscosities were measured at various temperatures using a Bohlin rheometer meter of the type VOR MELT. The results are listed in table 1.

A vulcanizable mixture was prepared in a manner analogous to that in example 1. The results are listed in table 2.

Example 3

The polymerization was carried out in a manner analogous to that in example 1, but with DIM as the chain transfer agent and at 85° C./36 bar. Furthermore, 0.26 g initiator was initially introduced and 1.56 g was subsequently metered in after 1 h and 0.78 g after a further 2.5 h. A total of 302 g vinylidene fluoride and 198 g hexafluoropropene were subsequently metered in within a reaction time of 612 min. 525 g of a viscous copolymer could be isolated by a working up analogous to that in example 1. The copolymer composition was 78.1 mole % VDF, 21.9 mole % HFP. The iodine content was 1.65 wt. % iodine.

A vulcanizable mixture was prepared in a manner analogous to that in example 1. The results are shown in table 2.

Example 4

The polymerization was carried out in a manner analogous to that in example 2 at 60° C., but without a chain transfer agent and by a single addition of 3.73 g tert-butyl peroxypivalate as TBPPI-75-AL (solution in aliphatics, peroxide content of 53.6%, Peroxid-Chemie GmbH). A total of 298 g vinylidene fluoride and 199 g hexafluoropropene were subsequently metered in within a reaction time of 1,249 min.

465 g of a rubber-like copolymer could be isolated by a working up analogous to that in example 1. The copolymer composition was 79.2 mole % VDF, 20.8 mole % HFP.

To prepare a crosslinkable mixture, 30 parts carbon black MT N 990, 6 parts calcium hydroxide, 3 parts magnesium oxide (Maglite D) and 4 parts of a mixture of bisphenol AF and Viton A (50/50 pt. by wt.) and 2 parts of a mixture of benzyltriphenylphosphonium chloride with Viton A (33/66 pt. by wt.) were incorporated into 100 parts by wt. of the fluorinated rubber copolymer on a well-cooled twin-roll mill.

The results are shown in table 2.

Example 5 (Comparison Example 1)
(Use of a Fluorohydrocarbon as the Polymerization Medium)

The polymerization was carried out in a manner analogous to that in example 1, 829 g 1,1,1,4,4,4-hexafluorobutane being employed instead of the PFBSF/PFS mixture. The internal pressure in the autoclave was 29 bar after initial introduction of the monomer and after reaching the reaction temperature of 80° C.

A total of 214 g vinylidene fluoride and 147 g hexafluoropropene were subsequently metered in within a reaction time of 1,320 min.

In contrast to example 1, after removal of the residual monomer, the reaction mixture was present as a uniform polymer solution, from which the solvent was distilled off. 387 g of a copolymer with 78.1 mole % VDF and 21.9 mole % HFP and an iodine content of 2.2 wt. % resulted.

A vulcanizable mixture was prepared in a manner analogous to that in example 1. The results are shown in table 2.

This comparison example shows that if a fluorohydrocarbon is employed as the polymerization medium, in spite of the improved solubility of the fluorine monomer (lower initial pressure) and of the resulting polymer, the reactor productivity is significantly lower than if the compounds according to the invention are used.

Example 6 (Comparison Example 2)
(Bulk Polymerization)

15.3 g diiodoperfluorobutane (DIPFB, Fluorochem Ltd.), after prior purification by extraction by shaking with aqueous sodium thiosulfate solution, 771 g VDF and 2,118 g HFP were initially introduced into a 4.1 l autoclave, which had been rendered inert by evacuating and pressurizing with nitrogen several times, and were heated to 60° C., while stirring. When this temperature was reached, the internal pressure in the autoclave was 37.7 bar. The polymerization was initiated by addition of 4.25 g tert-butyl peroxypivalate as TBPPI-75-AL (solution in aliphatics, peroxide content of 47.1%, Peroxid-Chemie GmbH).

A total of 308 g vinylidene fluoride and 202 g hexafluoropropene were subsequently metered in within a reaction time of 1,779 min. When the polymerization had ended, the unreacted monomer mixture was removed from the reactor by pressure release and evacuation. The polymer could not be discharged from the autoclave by simple draining, as in examples 1–3. The polymer was dissolved out with the aid of 3 l acetone and precipitated from this solution with n-hexane. After drying, 481 g of a viscous polymer with a composition of 76.7 mole % VDF and 23.3 mole % HFP and 1 wt. % iodine were obtained.

A vulcanizable mixture was prepared in a manner analogous to that in example 1. The results are shown in table 2.

This comparison examples shows that with a polymerization in the pure liquid monomer phase, in spite of a considerably larger amount of monomer initially introduced a significantly lower reactor productivity is achieved and the discharge of the product presents great problems. Furthermore, chain transfer is evidently made difficult, which manifests itself in a lower incorporation of iodine and poorer crosslinkability.

TABLE 1

Complex viscosities η* at various temperatures, measured with a Bohlin rheometer VOR-Melt (cycle frequency ω = 6.3 s⁻¹), in each case in Pa · s

|  | Example | | | | Comparison example | |
|---|---|---|---|---|---|---|
|  | 1 | 2 | 3 | 4 | 5/comp #1 | 6/comp #2 |
| 40° C. | 5650 | 5190 | 6040 | 88700 | 1430 | 20700 |
| 80° C. | 271 | 242 | 266 | 42200 | 53,7 | 1800 |
| 100° C. | 85,4 | 72,4 | 77 | 27900 | 15,0 | 541 |
| 140° C. | 14,1 | 8,69 | 11,2 | 11100 | 2,44 | 73,9 |

TABLE 2

Vulcanization results and properties of the vulcanization products

|  | Example | | | | Comparison | |
|---|---|---|---|---|---|---|
|  | 1 | 2 | 3 | 4 | 1 | 2 |
| MDR results | | | | | | |
| s'min [dNm]¹ | 0,01 | 0,01 | 0,01 | 0,66 | 0,02 | 0,03 |
| s'max [dNm]² | 18,4 | 18,3 | 17,2 | 19,53 | 11,1 | 12,4 |
| t 90 [min]³ | 8,1 | 8,8 | 9,4 | 2,1 | 9,2 | 4,6 |
| Mechanical properties | | | | | | |
| Tensile strength [N/mm²]⁴ | 10 | 10 | 11 | 13 | 7,5 | 8,7 |
| Elongation [%] | 127 | 126 | 148 | 202 | 96 | 168 |
| S₅₀ [N/mm²] | 3,6 | 3,5 | 3,4 | 2,7 | 3,4 | 2,4 |

¹and
²: viscosity
³: time to reach 90% of cure.
⁴: tear measurement at 50%.

What is claimed is:

1. A process for the preparation of low-viscosity fluorinated rubbers, which comprises polymerizing at least one fluorine monomer by free radicals in the presence of one or more of the compounds of the formulae (I) or (II) or mixtures thereof $$R^1 \!-\! SO_2 \!-\! R^2, \quad (I)$$

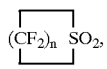  (II)

wherein $R^1$ represents a fluorine atom or a perfluoroalkyl radical having 1–4 C atoms and $R^2$ represents a perfluoroalkyl radical having 1–4 C atoms and n=4 or 5, and, optionally, a molecular weight regulator.

2. A process according to claim 1, wherein the free-radical polymerization is carried out in the presence of at least one organic or fluoroorganic dialkyl peroxide, diacyl peroxide, dialkyl peroxydicarbonate, alkyl perester and/or perketal as an initiator.

3. A process according to claim 1, wherein at least one compound of the formula (III)

$$R^3Br_nI_m \quad (III)$$

where m and n=0 to 2 and m+n=1 or 2, wherein $R^3$ is an aliphatic hydrocarbon, fluorohydrocarbon, fluorochlorohydrocarbon or fluorocarbon radical having 1–8 C atoms, is employed as molecular weight regulator.

4. A process according to claim 2, wherein at least one compound of the formula (III)

$$R^3Br_nI_m \quad (III)$$

where m and n=0 to 2 and m+n=1 or 2, wherein $R^3$ is an aliphatic hydrocarbon, fluorohydrocarbon, fluorochlorohydrocarbon or fluorocarbon radical having 1–8 C atoms, is employed as molecular weight regulator.

5. A process according to claim 2, characterized in that at least one fluoroorganic dialkyl peroxide, diacyl peroxide, dialkyl peroxydicarbonate, alkyl perester and/or perketal is employed as the initiator, in combination with a molecular weight regulator of the formula (III) $R^3Br_nI_m$, in which $R^3$ is a hydrocarbon radical having 1–8 carbon atoms and m and n=0–2 and m+n=1 or 2.

6. A process according to claim 3, wherein an organic peroxide which does not contain fluorine is employed as the initiator, and is used in combination with a molecular weight regulator of the formula (III) in which $R^3$ is a fluorohydrocarbon or fluorocarbon radical having 1 to 8 carbon atoms.

7. A process according to claim 1, wherein an organic peroxide which does not contain fluorine is employed as the initiator, in combination with a molecular weight regulator of the formula (III)

$$R^3Br_nI_m \quad (III)$$

where $R^3$=a hydrocarbon radical having 1–8 C atoms and m and n=0–2 and m+n=1 or 2, and wherein a maximum of 10% of the amount of initiator is initially introduced at the start of polymerization and the remaining amount is added in portions.

8. A process according to claim 2, wherein an organic peroxide which does not contain fluorine is employed as the initiator, in combination with a molecular weight regulator of the formula (III)

$$R^3Br_nI_m \quad (III)$$

where $R^3$=a hydrocarbon radical having 1–8 C atoms and m and n=0–2 and m+n=1 or 2, and wherein a maximum of 10% of the amount of initiator is initially introduced at the start of polymerization and the remaining amount is added in portions.

9. A process according to claim 3, wherein an organic peroxide which does not contain fluorine is employed as the initiator, in combination with a molecular weight regulator of the formula (III)

$$R^3Br_nI_m \quad (III)$$

where $R^3$=a hydrocarbon radical having 1–8 C atoms and m and n=0–2 and m+n=1 or 2, and wherein a maximum of 10% of the amount of initiator is initially introduced at the start of polymerization and the remaining amount is added in portions.

10. A process according to claim 4, wherein an organic peroxide which does not contain fluorine is employed as the initiator, in combination with a molecular weight regulator of the formula (III)

$$R^3Br_nI_m \quad (III)$$

where $R^3$=a hydrocarbon radical having 1–8 C atoms and m and n=0–2 and m+n=1 or 2, and wherein a maximum of 10% of the amount of initiator is initially introduced at the start of polymerization and the remaining amount is added in portions.

11. A process according to claim 5, wherein an organic peroxide which does not contain fluorine is employed as the initiator, in combination with a molecular weight regulator of the formula (III)

$$R^3Br_nI_m \quad (III)$$

where $R^3$=a hydrocarbon radical having 1–8 C atoms and m and n=0–2 and m+n=1 or 2, and wherein a maximum of 10% of the amount of initiator is initially introduced at the start of polymerization and the remaining amount is added in portions.

12. A process according to claim 6, wherein an organic peroxide which does not contain fluorine is employed as the initiator, in combination with a molecular weight regulator of the formula (III)

$$R^3Br_nI_m \quad (III)$$

where $R^3$=a hydrocarbon radical having 1–8 C atoms and m and n=0–2 and m+n=1 or 2, and wherein a maximum of 10% of the amount of initiator is initially introduced at the start of polymerization and the remaining amount is added in portions.

13. The process of claim 1, wherein the polymerization is carried out in the presence of a compound of formula (I).

14. The process of claim 1, wherein the polymerization is carried out in the presence of a compound of formula (II).

15. The process of claim 1, wherein the polymerization is carried out in the presence of a mixture of compounds of formula (I) and (II).

16. The process of claim 13, wherein the compound is selected from $C_3F_7SO_2F$, $C_4F_9SO_2F$ and $(CF_3)_2 SO_2$.

17. The process of claim 2, wherein the compound is selected from $C_3F_7SO_2F$, $C_4F_9SO_2F$ and $(CF_3)_2 SO_2$.

18. The process of claim 3, wherein the compound is selected from $C_3F_7SO_2F$, $C_4F_9SO_2F$ and $(CF_3)_2 SO_2$.

19. The process of claim 7, wherein the compound is selected from $C_3F_7SO_2F$, $C_4F_9SO_2F$ and $(CF_3)_2 SO_2$.

* * * * *